United States Patent [19]
Takai et al.

[11] Patent Number: 5,771,451
[45] Date of Patent: Jun. 23, 1998

[54] METHOD OF TRANSMISSION POWER CONTROL IN A CELLULAR MOBILE COMMUNICATION SYSTEM AND APPARATUS THEREOF

[75] Inventors: Kenichi Takai; Kyouji Watanabe, both of Tokyo, Japan

[73] Assignee: NEC Corporation, Tokyo, Japan

[21] Appl. No.: 707,442

[22] Filed: Sep. 4, 1996

[30] Foreign Application Priority Data

Sep. 4, 1995 [JP] Japan ................................ 7-226583

[51] Int. Cl.$^6$ ............................................... H04Q 7/22
[52] U.S. Cl. ........................ 455/442; 455/522; 370/332
[58] Field of Search ................... 455/436, 437, 455/438, 439, 442, 69, 522; 370/332, 320, 335, 342

[56] References Cited

U.S. PATENT DOCUMENTS 5,267,261  11/1993  Blakeney, II et al. ................. 455/442
5,548,808   8/1996  Bruckert et al. ....................... 455/442
5,623,486   4/1997  Dohi et al. ............................... 455/69

FOREIGN PATENT DOCUMENTS

62-92526   4/1987  Japan .
7-95151    4/1995  Japan .

Primary Examiner—Amelia Au
Attorney, Agent, or Firm—Foley & Lardner

[57] ABSTRACT

A method and apparatus of transmission power control to minimize a downward interference caused by the soft hand-off operation for a mobile station existing in the cell border in a cellular mobile communication system which uses a code division multiple access (CDMA) system for radio communication system are provided. The mobile station detects the signal power of pilot channels of the respective base stations A and B, and reports them to the respective base stations. Each base station calculates the propagation characteristic between the mobile station and the base station to determine a transmission power of the traffic channel, which is the most suitable level for the mobile station which is executing the soft hand-off operation, based on the relation among the reported information, the current transmission power of the pilot channel and the traffic channel. The respective base station controls the transmission power of the traffic channel in such the manner that all the received signal power of the traffic channels at the mobile station should be the same, and that the resultant received signal power of the downward traffic channels at the mobile station is made constant.

6 Claims, 11 Drawing Sheets

METHOD OF TRANSMISSION POWER CONTROL IN A CELLULAR MOBILE COMMUNICATION SYSTEM AND APPARATUS THEREOF

BACKGROUND OF THE INVENTION

1. Field of the invention

The present invention relates to a method and apparatus of transmission power control in a cellular mobile communication system which uses a code division multiple access (COMA) system for radio communication system, and, more particularly, to a method and apparatus of transmission power control for downward traffic channels to be transmitted from a base station to a mobile station which carries out a soft hand-off operation which enables a hand-off without interruption of communication by simultaneous communication with a plurality of base stations.

2. Description of the Related Art

In a system design of the cellular mobile communication system using a code division multiple access (COMA) system for the radio communication system, it is important how many channel capacity is obtained in one radio zone (cell) provided by a base station using a limited radio frequency band.

In a CDMA system, a plurality of mobile stations communicate on the same radio frequency, and an interference of communication between the respective mobile stations is ensured to be decreased due to orthogonality between the codes assigned to the respective mobile stations. Further, it is desirable that all the levels of a plurality of radio signals to be received at one reception point are equalized one another in order to derive the orthogonality between the codes efficiently.

Therefore, in the cellular mobile communication system, particularly, with respect to an upward (a destination from mobile station to base station) communication in which a synchronization among the mobile stations within the same radio zone cannot be ensured, it is general that the strict transmission power control is carried out at each mobile station in order that the radio signals transmitted from the respective mobile stations are to be received at the base station with all same level.

There are proposed several techniques in the prior art relating to a transmission power control in the cellular mobile communication system.

The gazette of Japanese Patent Application Laid Open No. (Kokai) 62(1987)-92526 proposes that the level control is carried out at the reception side (base station) of the upward traffic channel.

Also, the gazette of Japanese Patent Application Laid Open No. (Kokai) 7(1995)-95151 proposes the techniques relating to a method of determining an initial transmission power of a downward (a destination from base station to mobile station) traffic channel. However, it does not propose a method of controlling a transmission power of a traffic channel during the communication between the mobile station and the base station, also does not propose a method of controlling a transmission power of a downward traffic channel relating to the soft hand-off operation which is characteristic to the CDMA system. The soft hand-off operation is a technique to realize the hand-off operation, change base station being communicating from one radio zone to another radio zone, without interruption of current communication. The simultaneous communication between the mobile station and two base stations, the current communicating base station and the base station newly to be communicated, is available in the transition operation in the soft hand-off operation.

The problem in the above-mentioned prior art techniques resides in that the soft hand-off operation is activated when the mobile station moves within the cell to reach the cell border, then an interference in a downward traffic channel is increased due to the signal of traffic channel transmitted from the neighboring base station to which the mobile station will communicate. This is because the initial transmission power of the traffic channel, transmitted from the base station is set fixedly, and is not controlled taking into consideration the transmission characteristic between the mobile station and the base station.

Further, other problem in the prior art techniques is that there is a possibility that an excessive power signal of a traffic channel is transmitted to the mobile station which is under execution of the soft hand-off operation, and that the interference in the downward traffic channel to the other mobile stations reside within the same cell or in the vicinity of the cell is increased due to the excessive power signal. This is also because the initial transmission power of the traffic channel signal, transmitted from the base station is set fixedly, and is not controlled so as to follow the movement of the mobile station.

Besides, there is a problem that the signal power of the downward traffic channel received at the mobile station is decreased irrespective of the activation of the soft hand-off operation exhibited when the mobile station moves to the vicinity of the cell border, thus deteriorating an error rate of the downward communication. This is also because the initial transmission power of the traffic channel signal, transmitted from the base station is set fixedly, and is not controlled so as to follow the movement of the mobile station.

SUMMARY OF THE INVENTION

It is an object of the present invention not only to control transmitting a downward traffic channel signal at a minimum transmission power which is required to satisfy a predetermined communication quality, irrespective of the location where the mobile station exists or the communication state (during the soft hand-off operation or not), thereby decreasing the power consumption of the transmitter, but also to decrease an interference of the downward traffic channel to other mobile stations which exist in the same cell or in the vicinity of the cell, thereby deriving the communication channel capacity of the system up to the maximum, thereby miniaturizing the size of devices of the system and realizing the effective use of the radio frequencies.

The present invention adapts to estimate a propagation characteristic of a downward channel based on a received signal power of a pilot channel which the mobile station is received from the base station, and decides the transmission power of traffic channel signal to be transmitted from the base station at the time of activation or during the soft hand-off operation by the mobile station.

Figure 1:
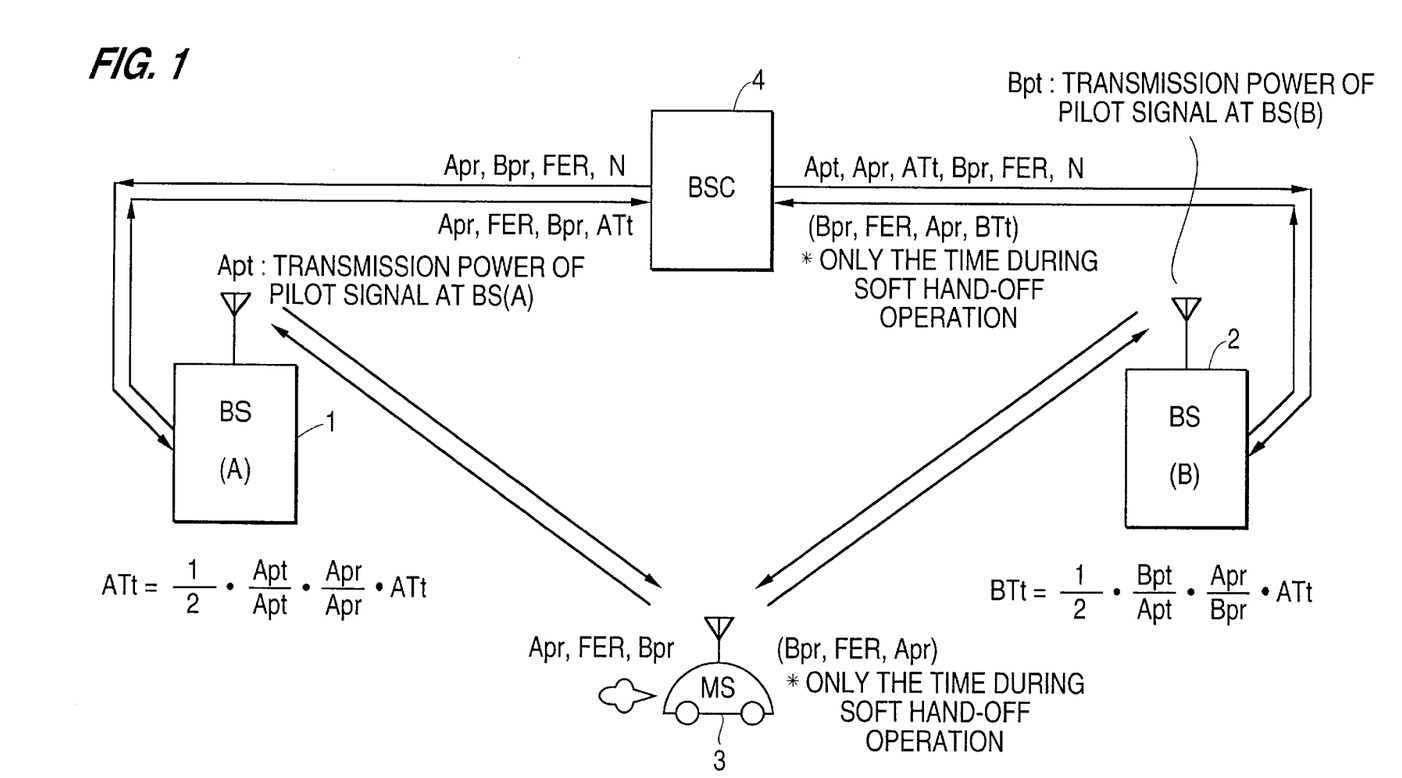
FIG. 1 is a view showing outline of configuration of the cellular mobile communication system according to first embodiment of the present invention.
Figure 6:
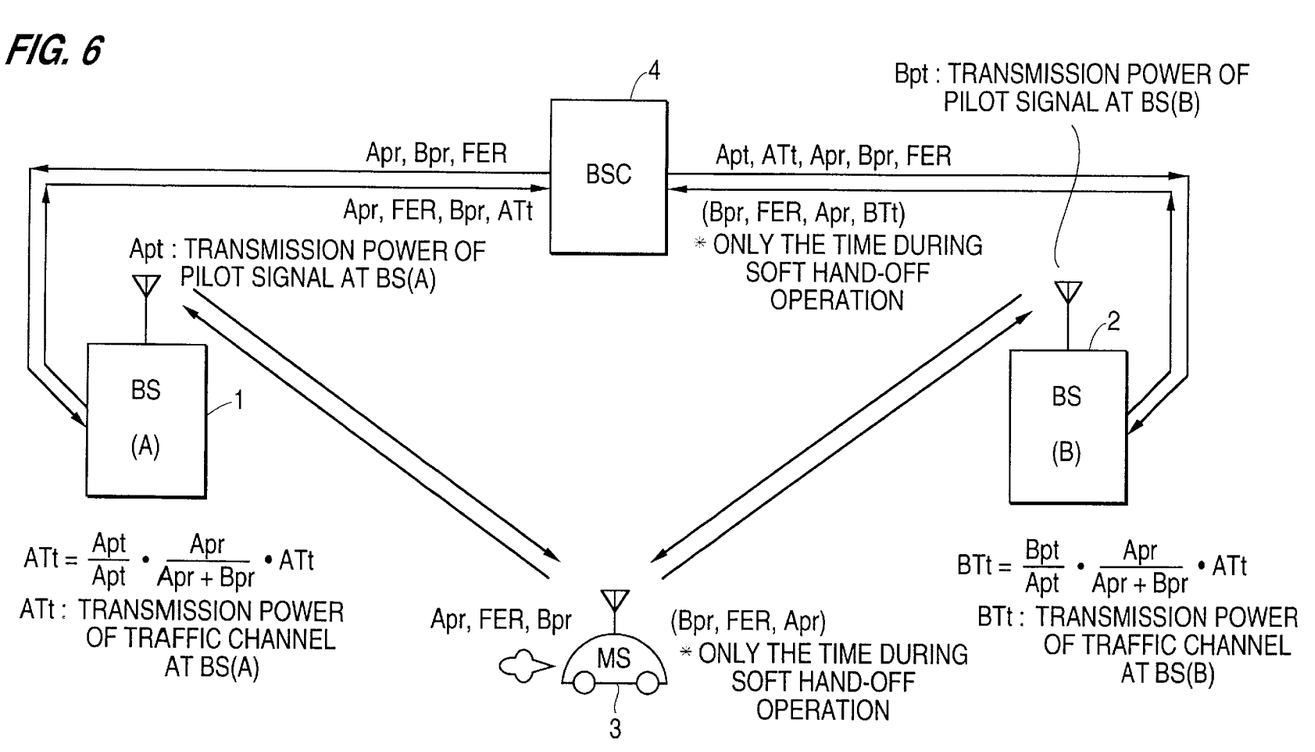
FIG. 6 is a view showing outline of configuration of the cellular mobile communication system according to second embodiment of the present invention.
Figure 9:
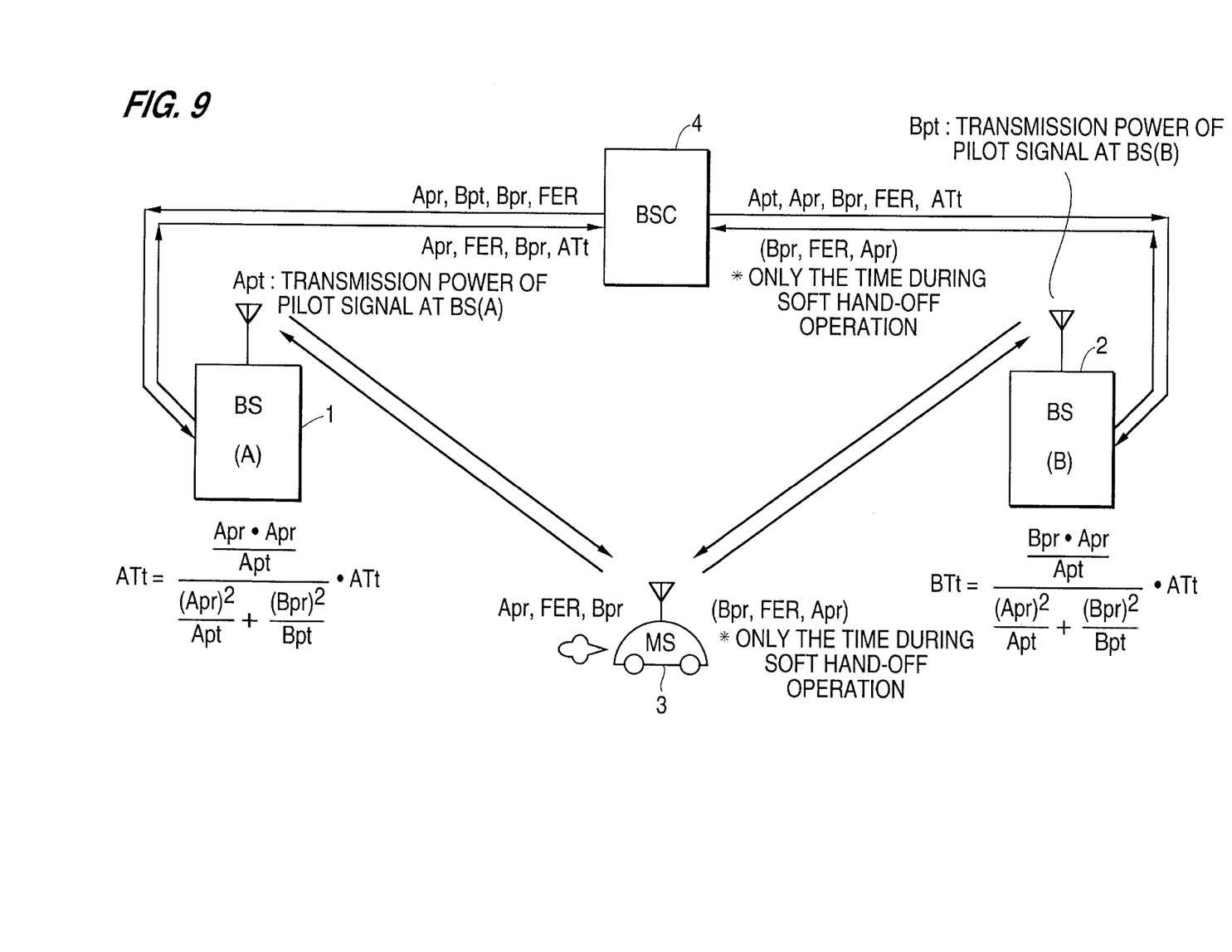
FIG. 9 is a view showing outline of configuration of the cellular mobile communication system according to third embodiment of the present invention.

More specifically, as shown in FIG. 1, FIG. 6 and FIG. 9, each of which shows outline of configuration of the cellular mobile communication system according to one embodiment of the present invention respectively, it is adapted to determine a transmission power level of a traffic channel of the base station while employing as parameters the transmission power level of the pilot channel of the respective base stations being previously memorized by an upper hierarchy station, a signal power level of the pilot channel of the respective base stations which is received and reported from the mobile station, an error rate of the traffic channel, and the transmission power level of the traffic channel being transmitted and reported from the base station.

Figure 3:
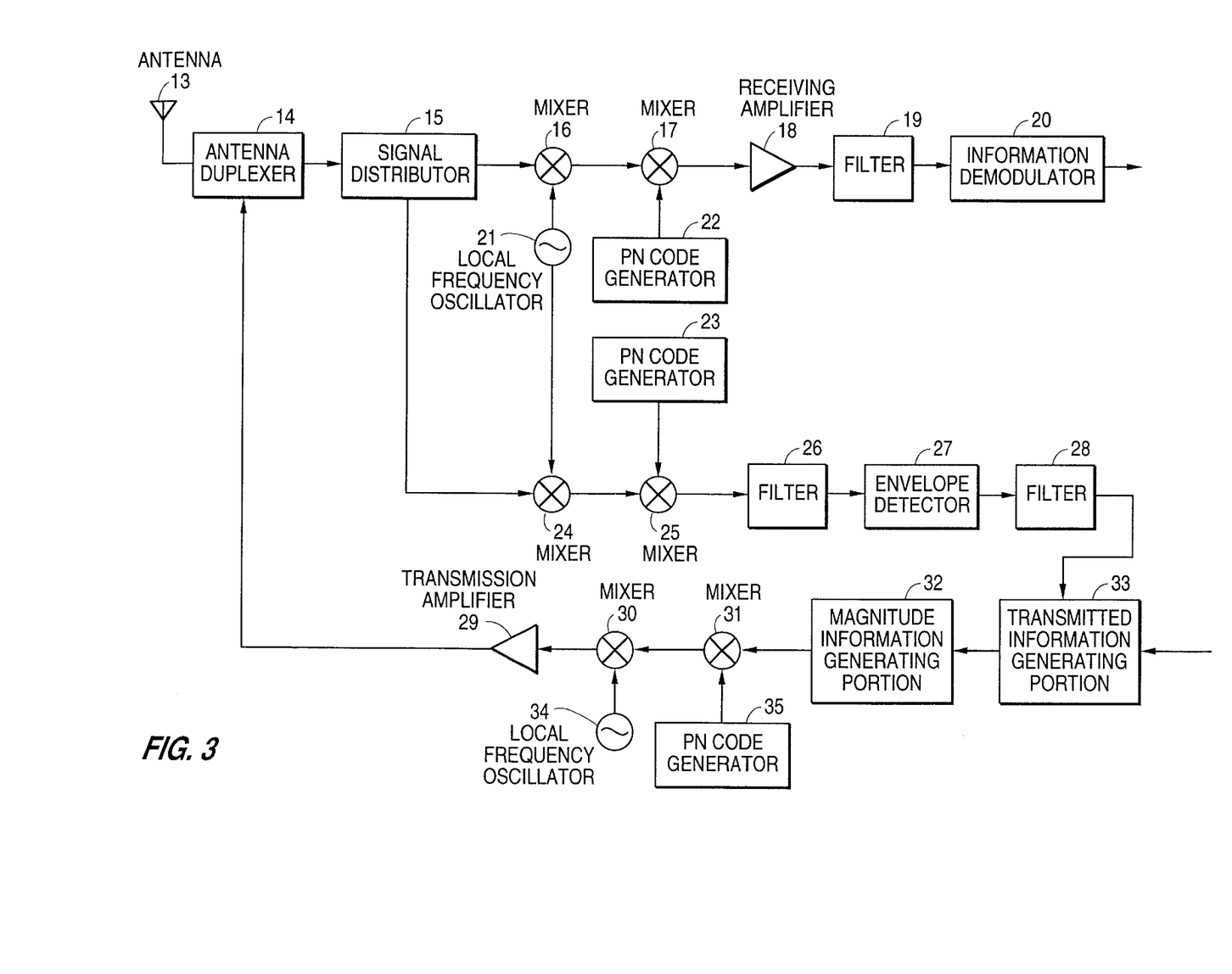
FIG. 3 is a view showing one example of a block diagram of a receiving and transmitting portion which is used at the mobile station shown in FIG. 1, FIG. 6 and FIG. 9, which shows one embodiment of the present invention respectively.

Also, the transmitting and receiving block of the mobile station shown in FIG. 3 is the main constitutional features of the present invention, and they are:

a mixer 24, a local frequency oscillator 21, a pilot channel PN (pseudo noise) code generator 23, a mixer 25, a filter 26, an envelope detector 27 and a filter 28 for receiving the signal of pilot channel from the base station to measure the power thereof; and a transmitted information generating portion 33, a magnitude information generating portion 32, a transmitting PN code generator 35, a mixer 31, a local frequency oscillator 34 for modulating a transmission data, a mixer 30, and a transmission signal amplifier 29 for transmitting the measured result of the received pilot channel to the base station.

Figure 2:
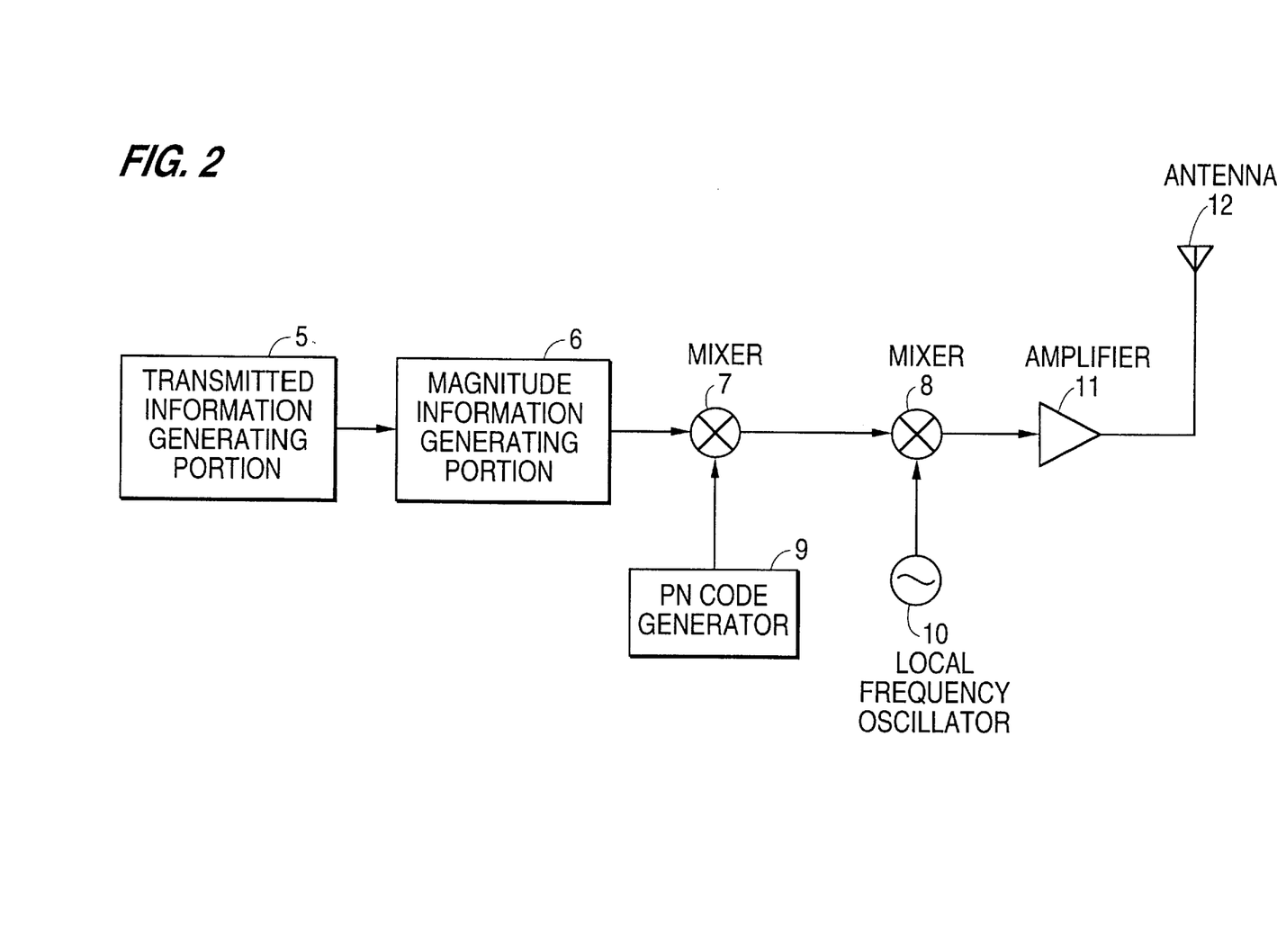
FIG. 2 is a view showing one example of a block diagram of a transmitting portion which is used at the base station shown in FIG. 1, FIG. 6 and FIG. 9, which shows one embodiment of the present invention respectively.

Further, the transmitting block of the base station shown in FIG. 2 is the main constitutional features of the present invention, and they are:

a transmitting information generating portion 5, a magnitude information generating portion 6, a mixer 7, a local frequency oscillator 10, a mixer 8 and a transmission signal amplifier 11.

More specifically, the present invention can be generally divided into the following three parts:

firstly, a method of controlling the transmission powers of the traffic channels of the respective base stations in such the manner that all the received signal level of the traffic channels transmitted from the respective base stations at the mobile station are equalized, and that the resultant received power of the traffic channels at the mobile station is made constant;

secondly, a method of controlling the transmission powers of the traffic channels of the respective basic stations in such the manner that a ratio of the received signal level of the traffic channels transmitted from the respective base stations at the mobile station is equalized with a ratio of the received signal level of the pilot channels transmitted from the respective basic stations, and that the resultant received power of the traffic channels at the mobile station is made constant; and thirdly, a method of controlling the transmission powers of the traffic channels of the respective basic stations in such the manner that a ratio of the transmission power of the traffic channel at the respective base stations is equalized with a ratio of the received signal level of the pilot channel at the mobile station, and that the resultant received power of the traffic channels at the mobile station is made constant.

According to the above-mentioned construction, the pilot channel signal in the CDMA format is received by the pilot channel receiving portion, and the signal is down-converted (radio signal transmitted in the air is converted into actual signal), reverse-diffused, and as the result, pure pilot signal is extracted, and then the reception level thereof is detected by the envelope detecting portion. The detected received signal level is transferred to the transmitted information generating portion of the transmitting block, and superimposed to the transmitting data to the base station for reporting. The received signal level information of the pilot channel superimposed to the transmitting data is diffused by the PN code generated at the transmitting PN code generator, and then up-converted (the signal handled in a circuit unit is converted to the suitable form for transmitting in the air in the CDMA format) for transmitting to the base station. The information received at the base station, transmitted from the mobile station, is down-converted and reverse-diffused, thereafter transmitted to the upper hierarchy station. The information of the received signal level is decoded at the upper hierarchy station, and the result is returned to the base station again, and inputted to a calculating circuit inside of the base station, which calculates the transmission power level of the downward traffic channel. The calculated result thereof is transmitted to the magnitude information generating portion of the transmitting block, and the transmission power level of the traffic channel is set.

As mentioned above, the propagation characteristic between the base station and the mobile station, which is moving, can be estimated at the base station by returning the received signal level of the pilot channel received at the mobile station to the base station.

BRIEF DESCRIPTION OF THE DRAWINGS

Range of distance for activating the soft hand-off operation: 2.4 km to 3.6 km from the base station A.

Value of Eb/No: Value of Eb/No (5.25 dB) at the 2.4 km point from the base station A before activating the soft hand-off operation is maintained.

Cell construction: Eight base stations (giving interferences) are surrounding around two base stations concerned.

Distance between two base stations: 6 km

Attenuation coefficient: a=3.5

Delay characteristic: isoelectric power two wave model

Ratio of a transmission power of one traffic channel to the whole: 2.5%

DETAILED DESCRIPTION OF THE PREFERRED EMBODIMENTS

The present invention will be described hereinafter with reference to the drawings.

FIG. 1 is a view showing outline of configuration of the cellular mobile communication system according to first embodiment of the present invention. This system mainly comprises base stations (BS) 1, 2, a mobile station 3, and a base station control unit (BSC) 4 for controlling them as an upper hierarchy station.

Further, in FIG. 2 is shown one embodiment of a basic block of a transmitting portion included in each of the base stations 1, 2. This transmitting block is constituted by a transmitted information generating portion 5 for generating information to be transmitted, a magnitude information generating portion 6 for generating a magnitude information of a transmitting output level, a PN (pseudo noise) code generator 9, a mixer 7 for superimposing the generated information and a PN code, a local frequency oscillator 10, a mixer 8 for modulating a PN diffused information at a local frequency, an amplifier 11 for amplifying the modulated signal to be transmitted up to a desired output level, and an antenna 12.

Besides, in FIG. 3 is shown one embodiment of a basic block of a transmitting and receiving portion included in a mobile station 3. A receiving block in this transmitting and receiving block is constituted by an antenna 13 for both of signal transmission and reception, an antenna duplexer 14, a signal distributor 15, a mixer 16 for down-converting the received signal, a mixer 17 for PN-reverse-diffusing the down-converted signal, a receiving amplifier 18, a filter 19, an information demodulator 20, a local frequency oscillator 21, a PN code generator 22 (for demodulating a received signal), a PN code generator 23 (for a pilot channel), a mixer 24 for down-converting a pilot channel, a mixer 25 for reverse-converting a pilot channel, a filter 26, an envelope detector 27 for detecting the received power level of the pilot channel, and a filter 28. Also, a transmitting block in the transmitting and receiving block is constituted by a transmitted information generating portion 33 for generating a transmitting information, a magnitude information generating portion 32 for determining a magnitude information for a transmitting output level, a PN code generator 35 (for signal transmission), a mixer 31 for diffusing data to be transmitted, a local frequency oscillator 34, a mixer 30 for modulating the data to be transmitted, and a transmission amplifier 29.

The operation of the first embodiment of the present invention will be described hereinbelow with referring to drawings of FIG. 1 to FIG. 5.

In FIG. 1, it is assumed that the mobile station (MS) exists in the cell of the base station A (BS(A)), being communicating with only the base station A and a desired communication qualities are satisfied. On this occasion, it is noted that Apt designates the transmission power of the pilot channel of the base station A, ATt a transmission power of the traffic channel, Apr the received signal power of the pilot channel of the base station A having been received at the mobile station, and FER the error rate of the traffic channel.

The mobile station is moving toward the base station B, and it is considered the moment that the mobile station activates the soft hand-off operation in association with the base station B. On this occasion, Bpr designates the received signal power of the pilot channel of the base station B having been received at the mobile station.

Figure 4:
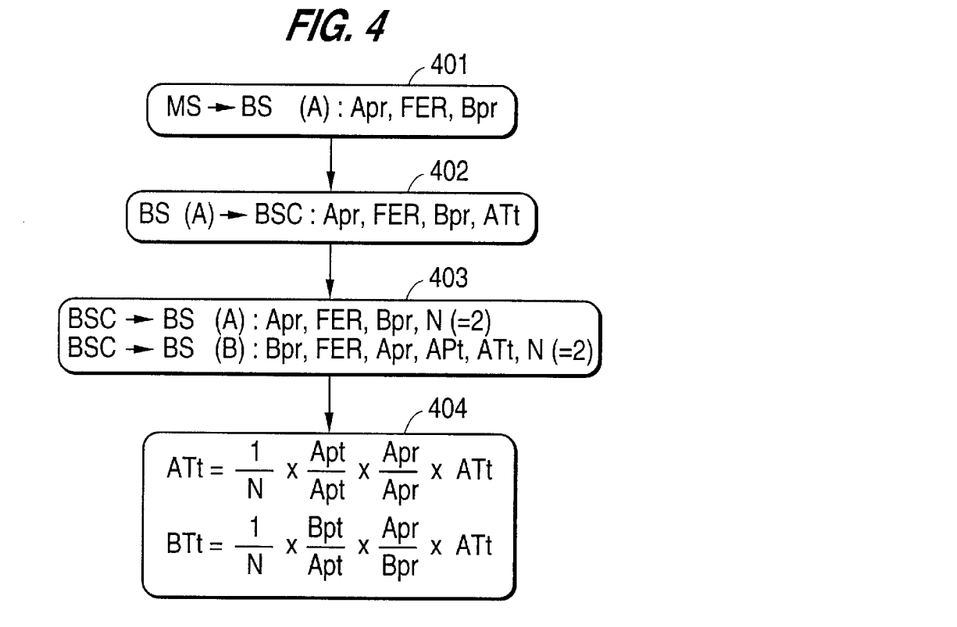
FIG. 4 is a view showing an execution flow employed when activating the soft hand-off operation according to the first embodiment of the present invention.

The mobile station detects Apr, FER and Bpr at the mobile station, and reports the detected information to the base station A during the communication with the base station A (step 401 of FIG. 4). The information reported by the mobile station is transferred to the base station control unit (BSC), as the upper hierarchy station, through the base station A together with the information of transmission power level of the traffic channel (ATt) currently the base station A is outputting (step 402 of FIG. 4). The base station control unit, which has received the report, decodes the information transmitted from the mobile station, and obtains the number (N) of all the base stations which will communicate with the mobile station in the soft hand-off operation of the mobile station, then returns it to the base station A together with the information of Apr, FER and Bpr. The base station control unit adds the information of ATt, reported from the base station A, and Apt, memorized in the base station control unit in advance, to the above-mentioned contents (Apr, FER, Bpr and N), and then, transmits them to the base station B (step 403 of FIG. 4).

The initial transmission power of the respective traffic channels of the base station A (ATt) and the base station B (BTt) are determined according to the calculation equation shown in FIG. 1 in the respective base stations A and B.

According to the calculation equation (the same is true of the equations in step 404 of FIG. 4 and step 504 of FIG. 5) which obtains ATt shown in FIG. 1, the transmission power of the traffic channels of the respective base stations are determined in such the manner that the mobile station receives the same signal power of respective traffic channels from the base stations A and B, and that the resultant received signal power of the traffic channels from the two base stations is equalized with the received signal power of the traffic channel having received from only the base station A before the mobile station activates the soft hand-off operation (step 404 of FIG. 4).

Further, it is considered the case that the mobile station continues to move after it has activated the soft hand-off operation, and that the propagation characteristic between the mobile station and the respective base stations is changed.

Figure 5:
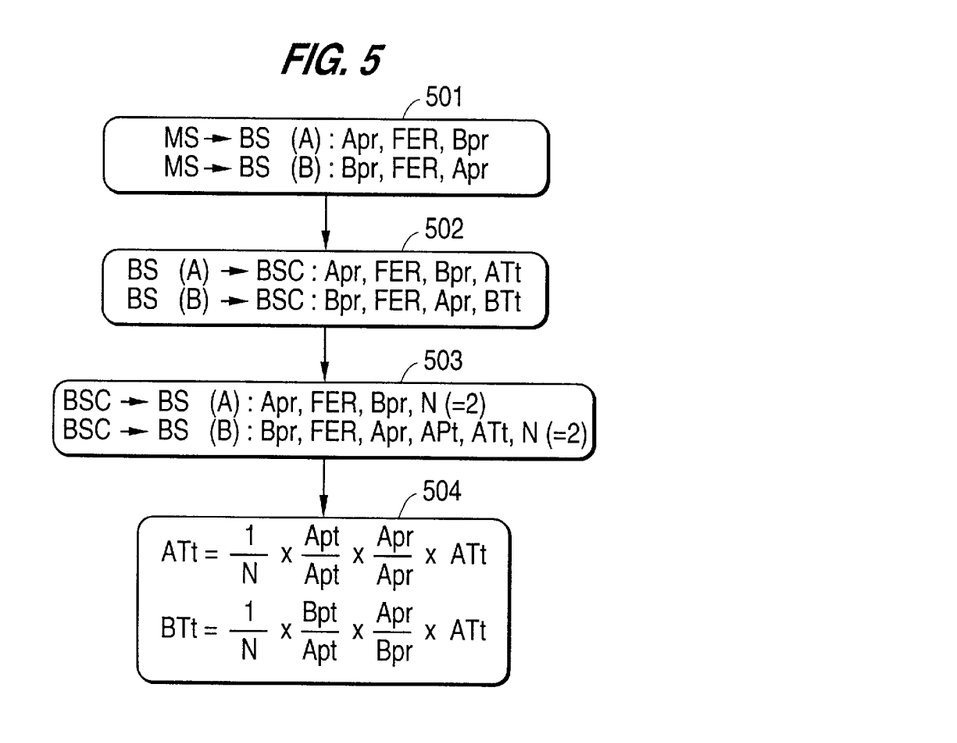
FIG. 5 is a view showing an execution flow employed during executing the soft hand-off operation according to the first embodiment of the present invention.

The mobile station detects Apr, FER and Bpr at the mobile station, and reports the detected information to the respective base stations A and B (step 501 of FIG. 5). The information reported by the mobile station is transferred to the base station control unit through the respective base stations A and B together with each of ATt and BTt (step 502 of FIG. 5). The base station control unit, which has received the report, decodes the information transmitted from the mobile station, and obtains the number (N) of all the base stations being communicating with the mobile station in the soft hand-off operation, then returns it to the base station A together with the information of Apr, FER and Bpr, and also the base station control unit transmits the information of ATt, Apt, Apr, FER, Bpr and N to the base station B (step 503 of FIG. 5).

The current transmission power of the respective traffic channels of the base station A (ATt) and the base station B (BTt) are determined according to the calculation equation described in above to maintain the transmission power of the traffic channels of the respective base stations are to be received by the same signal power, and also to maintain the resultant received signal power of the traffic channels from the two base stations to be equalized (step 504 of FIG. 5).

Further, in the above-mentioned description, it is assumed that the resultant received signal power of the traffic channel at the mobile station is to be always constant. However, in alternative, it may possible to increase or decrease the transmission power of the traffic channel in the respective base stations A and B at the same ratio in such the manner that the error rate of the traffic channel which is reported from the mobile station satisfy the desired value, after the respective base stations A and B determine the transmission power according to the above-mentioned equation.

Next, the operation of the second embodiment of the present invention will be described with reference to FIG. 6 FIG. 7 and FIG. 8.

In FIG. 2, it is assumed that the mobile station (MS) exists in the cell of the base station A (BS(A)), communicates with only the base station A and a desired communication qualities are satisfied. On this occasion, it is noted that Apt designates the transmission power of the pilot channel of the base station A, ATt a transmission power of the traffic channel, Apr the received signal power of the pilot channel of the base station A received at the mobile station, and FER an error rate of the traffic channel.

It is considered the moment that the mobile station is moving toward the base station B and activates the soft hand-off operation in association with the base station B. On this occasion, Bpr designates the received signal power of the pilot channel of the base station B received at the mobile station.

Figure 7:
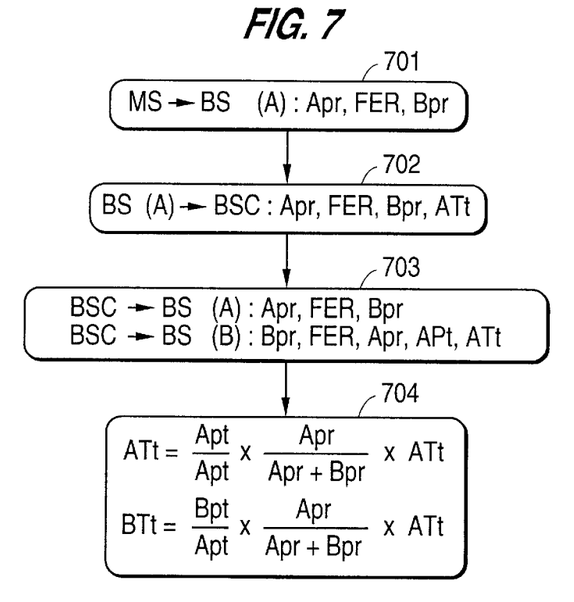
FIG. 7 is a view showing an execution flow employed when activating the soft hand-off operation according to the second embodiment of the present invention.

The mobile station reports Apr, FER, Bpr to the base station A during the communication with the base station A (step 701 of FIG. 7). The information reported by the mobile station is transferred to the base station control unit (BSC) through the base station A together with the transmission power of the traffic channel (ATt) at the base station A (step 702 of FIG. 7). The base station control unit, which has received the reported information, decodes the information and the decoded information of Apr, FER and Bpr is returned to the base station A. The base station control unit also transfers the information of ATt and Apt in addition to the above-mentioned contents (Apr, FER and Bpr) to the base station B (step 703 of FIG. 7).

The initial transmission power of the respective traffic channels of the base station A (ATt) and the base station B (BTt) are determined according to the calculation equation shown in FIG. 6 in the respective base stations A and B.

According to the calculation equation (the same is true of the equations in step 704 of FIG. 7 and step 804 of FIG. 8) which obtains ATt shown in FIG. 6, the transmission power of the traffic channels of the respective base stations are determined in such the manner that the mobile station receives respective traffic channels from the base stations A and B in the same ratio of received signal power of respective pilot channels from the base stations A and B, and that the resultant received signal power of the traffic channels from the two base stations is equalized with the received signal power of the traffic channel having received from only the base station A before the mobile station activates the soft hand-off operation (step 704 of FIG. 7).

Further, it is considered the case that the mobile station continues to move after it has activated the soft hand-off operation, and that the propagation characteristic between the mobile station and the respective base stations is changed due to movement of the mobile station.

Figure 8:
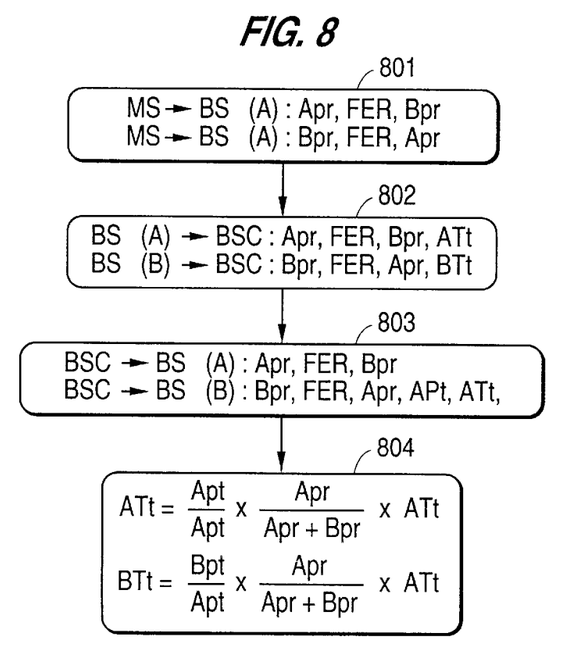
FIG. 8 is a view showing an execution flow employed during executing the soft hand-off operation according to the second embodiment of the present invention.

The mobile station detects Apr, FER and Bpr at the mobile station, and reports the detected information to the respective base stations A and B (step 801 of FIG. 8). The information reported by the mobile station is transferred to the base station control unit through the respective base stations A and B together with each of ATt and BTt (step 802 of FIG. 8). The base station control unit, which has received the reported information, decodes the information and the decoded information of Apr, FER and Bpr is returned to the base station A. The base station control unit also transfers the information of ATt and Apt in addition to the above-mentioned contents (Apr, FER and Bpr) to the base station B (step 803 of FIG. 8).

The current transmission power of the respective traffic channels of the base station A (ATt) and the base station B (BTt) are determined according to the calculation equation described in above to maintain the transmission power of the traffic channels of the respective base stations are to be received by the same ratio of received signal power of respective pilot channels from the base stations A and B, and also to maintain the resultant received signal power of the traffic channels from the two base stations to be equalized (step 804 of FIG. 8).

Further, in the above-mentioned description, it is assumed that the resultant received signal power of the traffic channel at the mobile station is to be always constant. However, in alternative, it may possible to increase or decrease the transmission power of the traffic channel in the respective base stations A and B at the same ratio in such the manner that the error rate of the traffic channel which is reported from the mobile station satisfy the desired value, after the respective base stations A and B determine the transmission power according to the above-mentioned equation.

Next, the operation of the third embodiment of the present invention will be described with reference to FIG. 9, FIG. 10 and FIG. 11.

In FIG. 9, it is assumed that the mobile station (MS) exists in the cell of the base station A (BS(A)), communicates with only the base station A and a desired communication qualities are satisfied. On this occasion, it is noted that Apt designates the transmission power of the pilot channel of the base station A, ATt a transmission power of the traffic channel of the base station A, Apr a received signal power of the pilot channel of the of the base station A at the mobile station, and FER an error rate of the traffic channel.

It is considered the moment that the mobile station is moving toward the base station B, and the soft hand-off operation is activated in association with the base station B. On this occasion, Bpr designates the received signal power of the pilot channel of the base station B at the mobile station.

Figure 10:
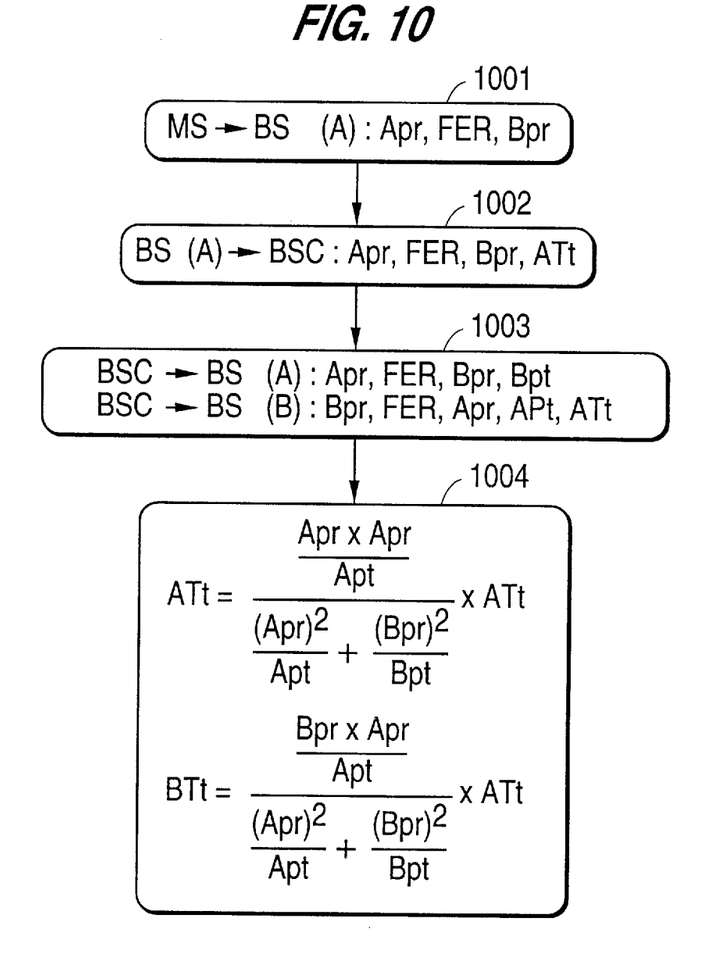
FIG. 10 is a view showing an execution flow employed when activating the soft hand-off operation according to the third embodiment of the present invention.

The mobile station reports Apr, FER, Bpr to the base station A during the communication with the base station A (step 1001 of FIG. 10). The information reported by the mobile station is transferred to the base station control unit through the base station A together with the information of ATt (step 1002 of FIG. 10). The base station control unit, which has received the reported information, decodes the information and returns the decoded information together with Bpt, which has been memorized in the base station control unit in advance, to the base station A, and also transmits the information of Apr, FER, Bpr, Apt and ATt to the base station B (step 1004 of FIG. 10).

The initial transmission power of the respective traffic channels are determined according to the calculation equation, in the base station A and the base station B.

According to the calculation equation (the same is true of the equations in FIG. 10 and FIG. 11) which obtains ATt shown in FIG. 9, the transmission power of the traffic channels of the respective base stations are determined in such the manner that the transmission power of the traffic channel from the respective base stations are transmitted at the same ratio as that of the received signal power of the pilot channel from the respective base stations at the mobile station, and that the resultant received signal power of the traffic channels from the two base stations A and B is equalized with the received signal power of the traffic channel which is received from only the base station A before the mobile station activates the soft hand-off operation.

Further, it is considered the case that the mobile station continues to move after it has activated the soft hand-off operation, and that the propagation characteristic between the mobile station and the respective base stations A and B is changed.

Figure 11:
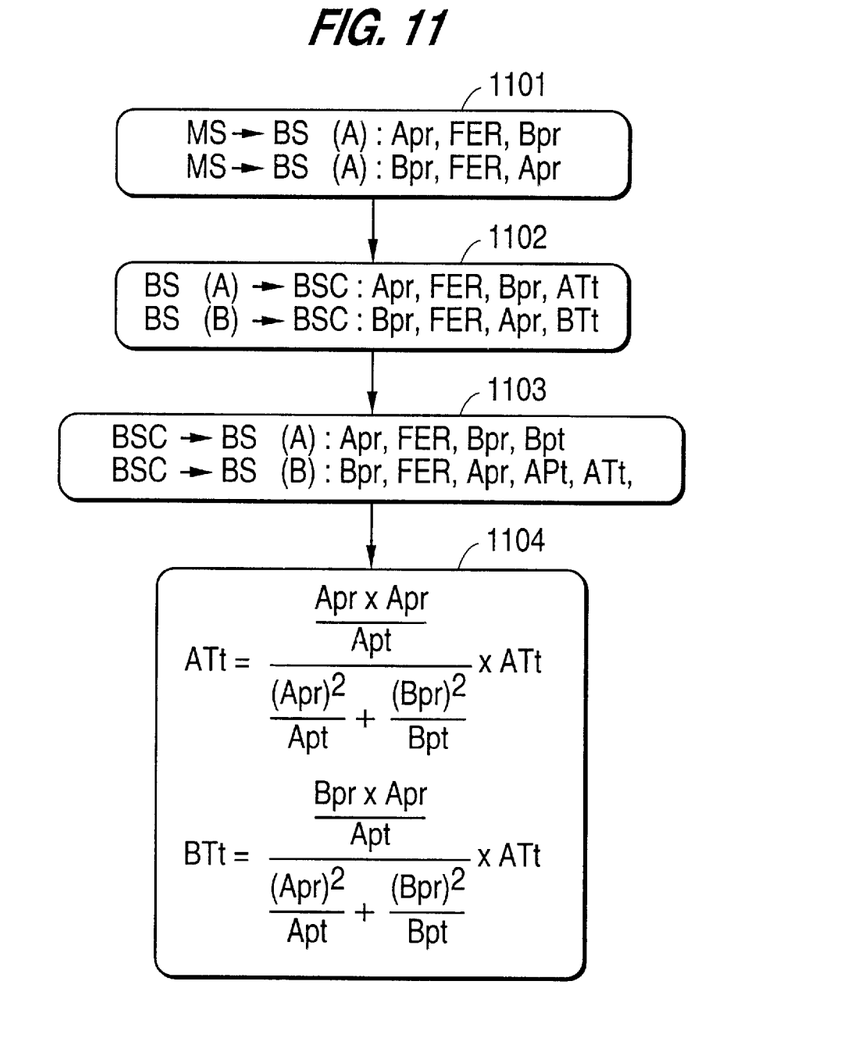
FIG. 11 is a view showing an execution flow employed during executing the soft hand-off operation according to the third embodiment of the present invention.

The mobile station detects Apr, FER and Bpr at the mobile station, and reports the detected information to the respective base stations A and B (step 1101 of FIG. 11). The information reported by the mobile station is transferred to the base station control unit through the respective base stations A and B together with each of ATt and BTt (step 1102 of FIG. 11). The base station control unit, which has received the reported information, decodes the information and the decoded information of Apr, FER, Bpr and Bpt is returned to the base station A. The base station control unit also transfers the information of ATt and Apt in addition to the above-mentioned contents (Apr, FER and Bpr) to the base station B (step 1103 of FIG. 11).

The current transmission power of the respective traffic channels of the base station A (ATt) and the base station B (BTt) are determined according to the calculation equation described in above to maintain the transmission power of the traffic channels of the respective base stations are to be received by the same ratio of received signal power of respective pilot channels from the base stations A and B, and also to maintain the resultant received signal power of the traffic channels from the two base stations to be equalized (step 1104 of FIG. 11).

Further, in the above-mentioned description, it is assumed that the resultant received signal power of the traffic channel at the mobile station is to be always constant. However, in alternative, it may possible to increase or decrease the transmission power of the traffic channel in the respective base stations A and B at the same ratio in such the manner that the error rate of the traffic channel which is reported from the mobile station satisfy the desired value, after the respective base stations A and B determine the transmission power according to the above-mentioned equation.

As described above, according to the present invention, the moment when the mobile station activates the soft hand-off operation, or during the soft hand-off operation, the interference caused by the downward traffic channel can be controlled at the minimum, and the received diversity gain of the downward traffic channels from the respective base stations can be made into the maximum. This is because the received signal power of the pilot channels from the respective base stations are measured at the mobile station, and the propagation characteristic between the mobile station and the respective base stations is calculated, so that the transmission power of the respective downward traffic channels is controlled in such the manner that all the received signal power of the traffic channels from the respective base stations should be the same, and that the resultant received signal power of the downward traffic channels at the mobile station is made constant.

Figure 12:
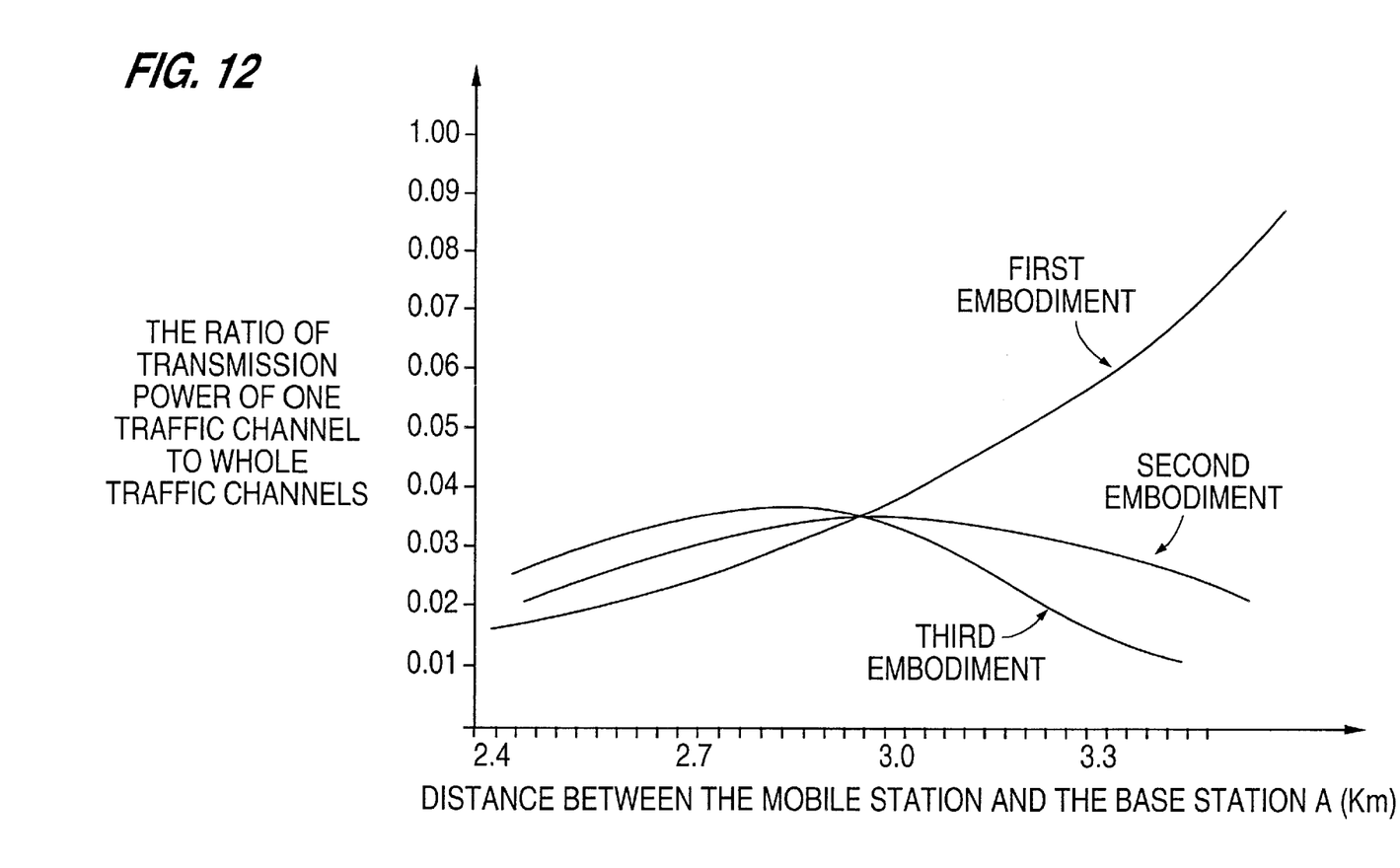
FIG. 12 is a graph showing the calculating result as to how the ratio of a transmission power of one traffic channel in the base station to the whole changes according to the distance between the mobile station and the base station in a case where the present invention is used. This calculation is based on the assumption described below.

Further, according to the present invention, the moment when the mobile station activates the soft hand-off operation, or during the soft hand-off operation, the interference caused by the downward traffic channels can be controlled at the minimum as shown in FIG. 12, and the interference can be distributed uniformly according to the size of the respective cells concerned with the soft hand-off operation. This is because the transmission power of the traffic channel of the respective base stations is controlled in such the manner that the ratio of the traffic channels being received at the mobile station from the respective base stations is equalized with the ratio of the received signal power of the pilot channels, and that the resultant received signal power of the traffic channels at the mobile station is made constant.

Further, according to the present invention, the moment when the mobile station activates the soft hand-off operation, or during the soft hand-off operation, the interference caused by the downward traffic channels can be controlled at the minimum, and the excessive downward interference to the cell which has larger propagation loss can be prevented by the transmission power control, which the transmission power of the downward traffic channel of the base station having smaller propagation loss is made strong and is made weak for the base station having larger propagation loss. This is because the received signal power of the pilot channel of the respective base stations is measured at the mobile station and the propagation characteristic between the mobile station and the respective base stations is calculated, so that the transmission power of the respective base stations is controlled in such a manner that the received signal power ratio of the traffic channels of respective base stations at the mobile station is equalized with the ratio of the received signal power of the pilot channels of respective base stations at the mobile station, and that the resultant received signal power of the traffic channels from the respective base stations is made constant. (Refer to FIG. 12)

Furthermore, according to the present invention, when the mobile station moves to the vicinity of the cell border, the received signal power of the downward traffic channel transmitted from the base stations is prevented from dropping irrespective of execution of the soft hand-off operation, so that the error rate is prevented from being deteriorated. This is because the transmission power of the traffic channel is controlled in such the manner that the resultant received signal power of the traffic channels at the mobile station is made constant always, or that the error rate of the traffic channel satisfies the desired value.

Figure 13:
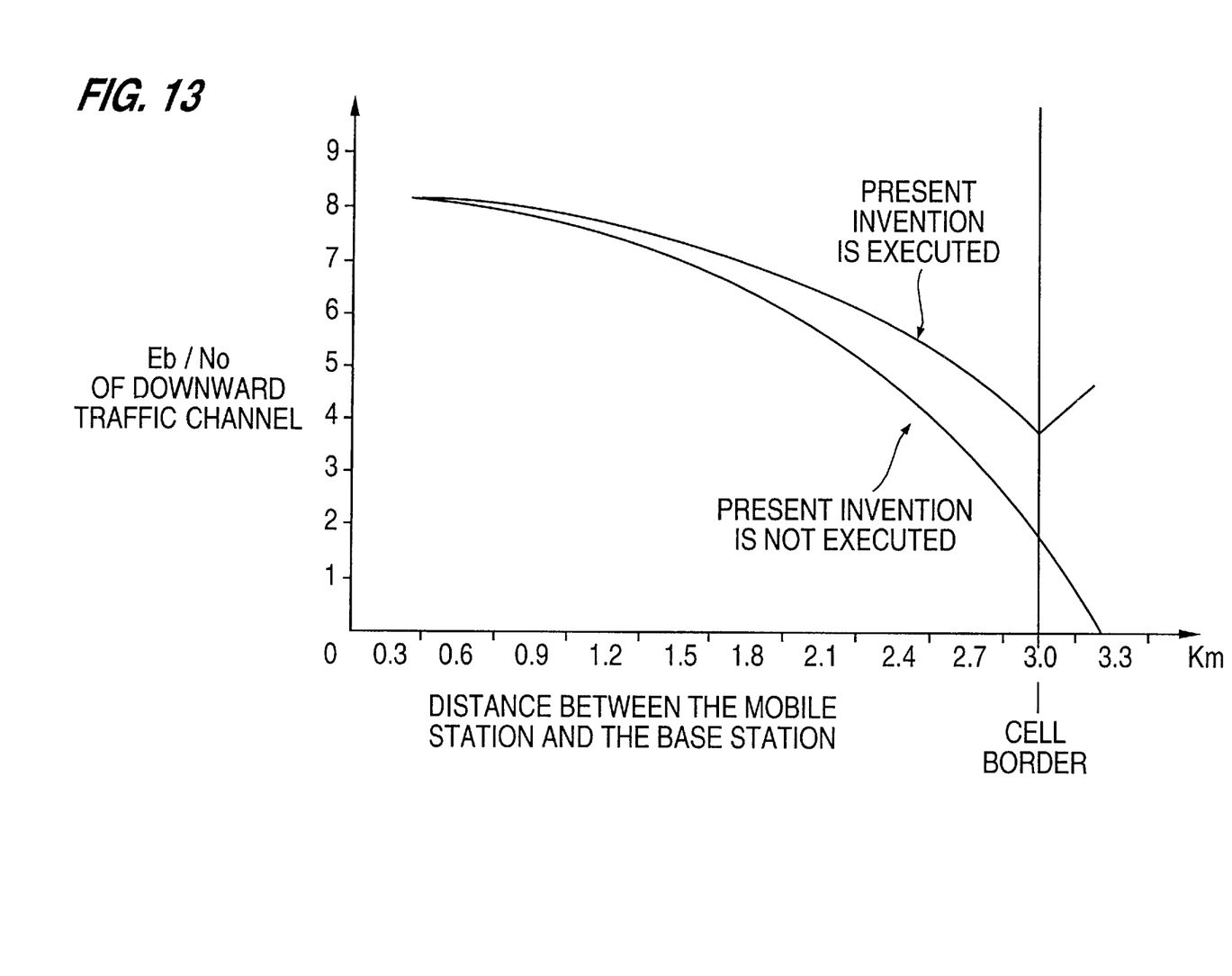
FIG. 13 is a graph showing the calculating result as to how the received signal level (Eb/No) of the downward traffic channel is changed according to the distance from the base station to the mobile station assuming that the mobile station communicates with only one base station in a case where the present invention is not used. This calculation is based on the assumption described below.

In the case where the present invention is not executed, the received signal level of the downward traffic channel at the mobile station is deteriorated at vicinity of the cell border as shown in FIG. 13, for example, in the case of FIG. 13, if Eb/No is less than 5 dB in the vicinity of the cell border, the error rate of the downward traffic channel exceeds 0.7 %.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A method of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the method comprising steps of:

detecting signal level of respective pilot signals transmitted from the first base station and the second base station at the mobile station;

reporting the detected signal level of pilot signals transmitted from the first base station and the second base station to the respective first base station and the second base station from the mobile station;

transferring transmission power level of the pilot signal and the traffic channel, currently being transmitted from the first base station, to the second base station;

decreasing the transmission power level of the traffic channel of the first base station to a half level of currently transmitting level; and calculating the transmission power level of the traffic channel of the second base station in accordance with information of transmission power level of the traffic channel currently being transmitted from the first base station, ratio of transmission power level of the pilot signals transmitted from the first base station and the second base station, and ratio of signal level of the pilot signals of the first base station and the second base station received at the mobile station.

2. A method of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the method comprising steps of:

detecting signal level of respective pilot signals transmitted from the first base station and the second base station at the mobile station;

reporting the detected signal level of pilot signals transmitted from the first base station and the second base station to the respective first base station and the second base station from the mobile station;

transferring transmission power level of the pilot signal and the traffic channel, currently being transmitted from the first base station, to the second base station;

calculating the transmission power level of the traffic channel of the first base station in accordance with information of ratio of the respective transmission power level of the pilot signals of the first base station and the second base station received at the mobile station; and calculating the transmission power level of the traffic channel of the second base station in accordance with information of transmission power level of the traffic channel currently being transmitted from the first base station, ratio of transmission power level of the pilot signals transmitted from the first base station and the second base station, and ratio of signal level of the pilot signals of the first base station and the second base station received at the mobile station.

3. A method of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the method comprising steps of:

detecting signal level of respective pilot signals transmitted from the first base station and the second base station at the mobile station;

reporting the detected signal level of pilot signals transmitted from the first base station and the second base station to the respective first base station and the second base station from the mobile station;

transferring transmission power level of the pilot signal and the traffic channel, currently being transmitted from the first base station, to the second base station;

transferring transmission power level of the pilot signal of the second base station, currently being transmitted from the first base station, to the first base station;

calculating the transmission power level of the traffic channel of the first base station in accordance with information of ratio of combination of the respective transmission power level of the pilot signals of the first base station and the second base station received at the mobile station and the respective transmission power level of the pilot signals of the first base station and the second base station currently being transmitted; and calculating the transmission power level of the traffic channel of the second base station in accordance with information of transmission power level of the traffic channel currently being transmitted from the first base station, ratio of combination of the respective transmission power level of the pilot signals of the first base station and the second base station received at the mobile station and the respective transmission power level of the pilot signals of the first base station and the second base station currently being transmitted.

4. An apparatus of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the apparatus comprising:

signal detection and reporting means in the mobile station for detecting signal level of respective pilot signals transmitted from the first base station and the second base station and reporting the detected signal level of pilot signals to the respective first base station and the second base station;

information transferring means for transferring transmission power level of the pilot signal and the traffic channel, currently being transmitted from the first base station, to the second base station;

first control means in the first base station for decreasing the transmission power level of the traffic channel of the first base station to a half level of currently transmitting level; and second control means in the second base station for calculating the transmission power level of the traffic channel of the second base station in accordance with information of transmission power level of the traffic channel currently being transmitted from the first base station, ratio of transmission power level of the pilot signals transmitted from the first base station and the second base station, and ratio of signal level of the pilot signals of the first base station and the second base station received at the mobile station.

5. An apparatus of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the apparatus comprising:

signal detection and reporting means in the mobile station for detecting signal level of respective pilot signals transmitted from the first base station and the second base station, and reporting the detected signal level of pilot signals to the respective first base station and the second base station;

information transferring means for transferring transmission power level of the pilot signal and the traffic channel, currently being transmitted from the first base station, to the second base station;

first control means in the first base station for calculating the transmission power level of the traffic channel of the first base station in accordance with information of ratio of the respective transmission power level of the pilot signals of the first base station and the second base station received at the mobile station; and second control means in the second base station for calculating the transmission power level of the traffic channel of the second base station in accordance with information of transmission power level of the traffic channel currently being transmitted from the first base station, ratio of transmission power level of the pilot signals transmitted from the first base station and the second base station, and ratio of signal level of the pilot signals of the first base station and the second base station received at the mobile station.

6. An apparatus of transmission power control in a cellular mobile communication system using a code division multiple access (CDMA) system for radio communication system, including a plurality of base stations each transmitting predetermined level of pilot signal, and a moving mobile station existing at first cell border in vicinity of second cell and activating soft hand-off operation providing the mobile station simultaneous communication with traffic channel of first base station currently being communicating in the first cell and with traffic channel of second base station to be newly communicating in the second cell, the apparatus comprising:

signal detection and reporting means in the mobile station for detecting signal level of respective pilot signals transmitted from the first base station and the second base station, and reporting the detected signal level of pilot signals transmitted from the first base station and the second base station to the respective first base station and the second base station;

information transferring means for transferring transmission power level of the pilot signal and the traffic channel, currently being transmitted from the first base station, to the second base station, and transferring transmission power level of the pilot signal of the second base station, currently being transmitted from the first base station, to the first base station;

first control means in the first base station for calculating the transmission power level of the traffic channel of the first base station in accordance with information of ratio of combination of the respective transmission power level of the pilot signals of the first base station and the second base station received at the mobile station and the respective transmission power level of the pilot signals of the first base station and the second base station currently being transmitted; and second control means in the second base station for calculating the transmission power level of the traffic channel of the second base station in accordance with information of transmission power level of the traffic channel currently being transmitted from the first base station, ratio of combination of the respective transmission power level of the pilot signals of the first base station and the second base station received at the mobile station and the respective transmission power level of the pilot signals of the first base station and the second base station currently being transmitted.

* * * * *